(12) United States Patent
Jin et al.

(10) Patent No.: US 11,582,194 B2
(45) Date of Patent: Feb. 14, 2023

(54) APPARATUS AND METHOD FOR MANAGING SECURITY POLICY OF FIREWALL

(71) Applicant: SAMSUNG SDS CO., LTD., Seoul (KR)

(72) Inventors: Yong Jun Jin, Seoul (KR); Hak Hyun Nam, Seoul (KR); Yang Hwan Joe, Seoul (KR); You Chang Ko, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 65 days.

(21) Appl. No.: 17/081,655

(22) Filed: Oct. 27, 2020

(65) Prior Publication Data

US 2021/0136039 A1    May 6, 2021

(30) Foreign Application Priority Data

Oct. 31, 2019   (KR) .................... 10-2019-0137598

(51) Int. Cl.
*H04L 9/40* (2022.01)
(52) U.S. Cl.
CPC ...... *H04L 63/0263* (2013.01); *H04L 63/1433* (2013.01)
(58) Field of Classification Search
CPC ................. H04L 63/0263; H04L 63/1433
USPC ............................................ 726/1
See application file for complete search history.

(56) References Cited

U.S. PATENT DOCUMENTS

| | | | | |
|---|---|---|---|---|
| 2006/0174337 A1* | 8/2006 | Bernoth | ............. | H04L 63/0263 726/11 |
| 2007/0124797 A1* | 5/2007 | Gupta | ................. | H04L 63/102 726/1 |
| 2009/0300748 A1* | 12/2009 | Diehl | ................. | H04L 63/0263 726/11 |
| 2010/0107217 A1* | 4/2010 | Liu | ...................... | H04N 21/84 726/1 |
| 2010/0154025 A1* | 6/2010 | Esteve Balducci | ..... | H04L 63/20 726/1 |
| 2015/0256545 A1* | 9/2015 | Dotterer, III | ............ | H04L 51/26 726/1 |

(Continued)

FOREIGN PATENT DOCUMENTS

KR    10-1640841 B1    8/2016

*Primary Examiner* — Dant B Shaifer Harriman
(74) *Attorney, Agent, or Firm* — The PL Law Group, PLLC (57) ABSTRACT

An apparatus for managing a security policy of a firewall according to an embodiment includes a rule request module that receives one or more requested rules to be applied to a firewall, a rule merge module that merges a pre-applied rule of the firewall and the one or more requested rules when the number of rules applied to the firewall exceeds a maximum number of rule registrations of the firewall due to the requested rule, and a firewall interface module that receives the pre-applied rule from the firewall and provides the pre-applied rule to the rule merge module, and re-registers a merged rule merged through the rule merge module in the firewall, and the rule merge module is configured to merge the pre-applied rule and the one or more requested rules so that a security vulnerable space occurring due to the merging is minimized.

20 Claims, 5 Drawing Sheets

(56) References Cited

U.S. PATENT DOCUMENTS

2016/0191466 A1\* 6/2016 Pernicha ............... H04L 63/20
                                                            726/1

\* cited by examiner

APPARATUS AND METHOD FOR MANAGING SECURITY POLICY OF FIREWALL

CROSS-REFERENCE TO RELATED APPLICATION

This application claims the benefit under 35 USC § 119(a) of Korean Patent Application No. 10-2019-0137598, filed on Oct. 31, 2019, in the Korean Intellectual Property Office, the entire disclosure of which is incorporated herein by reference for all purposes.

BACKGROUND

1. Field

The disclosed embodiments relate to technology for managing a security policy of a network firewall.

2. Description of Related Art

A firewall is a network security system that monitors and controls incoming and outgoing network traffic based on a predefined security rule. A firewall generally configures a barrier between trusted an internal network and an untrusted external network (such as the Internet). Recently, as a trend of cloud-based provisioning of IT resources is increasing, the use of a cloud firewall to protect a cloud server and infrastructure is increasing. The cloud firewall controls network traffic based on a plurality of firewall rules registered by an administrator. However, there is a limit to the number of rules that can be registered in the firewall due to memory limitations of the firewall, etc.

SUMMARY

The disclosed embodiments are intended to provide technical means for efficiently registering and managing a policy of a firewall.

According to an embodiment, there is provided an apparatus for managing a security policy of a firewall including a rule request module that receives one or more requested rules to be applied to a firewall, a rule merge module that merges a pre-applied rule of the firewall with the one or more requested rules when a number of rules applied to the firewall exceeds a maximum number of rule registrations of the firewall due to the requested rule, and a firewall interface module that receives the pre-applied rule from the firewall and provides the pre-applied rule to the rule merge module, and re-registers a merged rule merged through the rule merge module in the firewall, in which the rule merge module merges the pre-applied rule with the one or more requested rules so that a security vulnerable space occurring due to the merging is minimized.

The rule merge module may configure a merge target rule set including the requested rule through the rule request module and a rule pre-applied to the firewall and merge a selected rule pair among merge target rules included in the configured rule set into one rule until a number of rules included in the rule set is less than or equal to the maximum number of rule registrations.

The rule merge module may calculate a security vulnerable space function value for each of all candidate rule pairs that can be derived from merge target rules included in the rule set, and select a rule pair for which the rule merging is to be performed according to the calculated security vulnerable space function value.

The rule merge module may calculate a security vulnerable space function value for a specific candidate rule pair by summing security vulnerable space for each of one or more policy elements included in the specific candidate rule pair.

The rule merge module may calculate the security vulnerable space function value by applying a preset weight to the security vulnerable space for each of one or more policy elements included in the specific candidate rule pair, and select a rule pair having a minimum security vulnerable space function value among the calculated security vulnerable space function values as a rule pair for which the rule merging is to be performed.

According to another exemplary embodiment, a rule request module that receives a requested rule to be applied to a firewall, a requested rule storing module that accumulates, stores, and manages the requested rule input through the rule request module, a rule merge module that merges at least some of a plurality of requested rules stored in the requested rule storing module when a number of requested rules stored in the requested rule storing module exceeds a maximum number of rule registrations of the firewall, and a firewall interface module that re-registers a merged rule merged through the rule merge module in the firewall are included, and the rule merge module may merge the requested rules so that a security vulnerable space occurring due to the merging is minimized.

The rule merging may configure a merge target rule set including the requested rules accumulated and stored in the requested rule storing module, and merge a selected rule pair among merge target rules included in the configured rule set into one rule until a number of rules included in the rule set is less than or equal to the maximum number of rule registrations.

The rule merge module may calculate a security vulnerable space function value for each of all candidate rule pairs that can be derived from merge target rules included in the rule set, and select a rule pair for which the rule merging is to be performed according to the calculated security vulnerable space function value.

The rule merge module may calculate a security vulnerable space function values for a specific candidate rule pair by summing security vulnerable space for each of one or more policy elements included in the specific candidate rule pair.

The rule merge module may calculate the security vulnerable space function value by applying a preset weight to the security vulnerable space for each of one or more policy elements included in the specific candidate rule pair, and select a rule pair having a minimum security vulnerable space function value among the calculated security vulnerable space function values as a rule pair for which the rule merging is to be performed.

According to still another exemplary embodiment, there is provided a method for managing a security policy of a firewall including receiving one or more requested rules to be applied to the firewall, receiving an pre-applied rule of the firewall from the firewall when a number of rules applied to the firewall exceeds a maximum number of rule registrations of the firewall due to the requested rule, merging the received pre-applied rule of the firewall with the one or more requested rules, and re-registers a merged rule in the firewall, in which, in the merging the rule, the pre-applied rule and the one or more requested rules are merged so that a security vulnerable space occurring due to the merging is minimized.

In the merging the rule, a merge target rule set including the requested rule and a rule pre-applied to the firewall may be configured and a selected rule pair among merge target rules is included in the configured rule set may be merged into one rule until a number of rules included in the rule set is less than or equal to the maximum number of rule registrations.

In the merging the rule, a security vulnerable space function value for each of all candidate rule pairs that can be derived from merge target rules included in the rule set may be calculated, and a rule pair for which the rule merging is to be performed may be selected according to the calculated security vulnerable space function value.

In the merging the rule, a security vulnerable space function value for a specific candidate rule pair may be calculated by summing security vulnerable space for each of one or more policy elements included in the specific candidate rule pair.

In the merging the rule, the security vulnerable space function value may be calculated by applying a preset weight to the security vulnerable space for each of one or more policy elements included in the specific candidate rule pair, and a rule pair having a minimum security vulnerable space function value among the calculated security vulnerable space function values may be selected as a rule pair for which the rule merging is to be performed.

According to still yet another exemplary embodiment, there is provided a method for managing a security policy of a firewall including receiving a requested rule to be applied to the firewall, accumulating, storing, and managing the requested rule input through inputting the rule request, merging at least some of a plurality of requested rules stored in the requested rule storing module when a number of requested rules stored exceeds a maximum number of rule registrations of the firewall, and re-registering a merged rule in the firewall, in which, in the merging the rule, the requested rule is merged so that a security vulnerable space occurring due to the merging is minimized.

In the merging the rule, a merge target rule set including the requested rules accumulated and stored in the accumulating, storing, and managing may be configured and a selected rule pair among merge target rules included in the configured rule set may be merged is into one rule until a number of rules included in the rule set is less than or equal to the maximum number of rule registrations.

In the merging the rule, a security vulnerable space function value for each of all candidate rule pairs that can be derived from merge target rules included in the rule set may be calculated, and a rule pair for which the rule merging is to be performed may be selected according to the calculated security vulnerable space function value.

In the merging the rule, a security vulnerable space function value for a specific candidate rule pair may be calculated by summing security vulnerable space for each of one or more policy elements included in the specific candidate rule pair.

In the merging the rule, the security vulnerable space function value may be calculated by applying a preset weight to the security vulnerable space for each of one or more policy elements included in the specific candidate rule pair, and a rule pair having a minimum security vulnerable space function value among the calculated security vulnerable space function values may be selected as a rule pair for which the rule merging is to be performed.

According to the disclosed embodiment, it is possible to effectively register a rule within a limited resource determined by a policy in a firewall hardware resource and a cloud service, and it is possible to minimize occurrence of a security vulnerable space generated during a merge process for rule registration.

DETAILED DESCRIPTION

Hereinafter, specific embodiments of the present invention will be described with reference to the accompanying drawings. The following detailed description is provided to aid in a comprehensive understanding of a method, a device and/or a system described in the present specification. However, the detailed description is only for illustrative purpose and the present invention is not limited thereto.

In describing the embodiments of the present invention, when it is determined that a detailed description of known technology related to the present invention may unnecessarily obscure the gist of the present invention, the detailed description thereof will be omitted. In addition, terms to be described later are terms defined in consideration of functions in the present invention, which may vary depending on intention or custom of a user or operator. Therefore, the definition of these terms should be made based on the contents throughout this specification. The terms used in the detailed description are only for describing the embodiments of the present invention and should not be used in a limiting sense. Unless explicitly used otherwise, an expression in a singular form includes a meaning of a plural form. In this description, expressions such as "including" or "comprising" are intended to indicate certain properties, numbers, steps, elements, and some or combinations thereof, and such expressions should not be interpreted to exclude the presence or possibility of one or more other properties, numbers, steps, elements other than those described, and some or combinations thereof.

Figure 1:
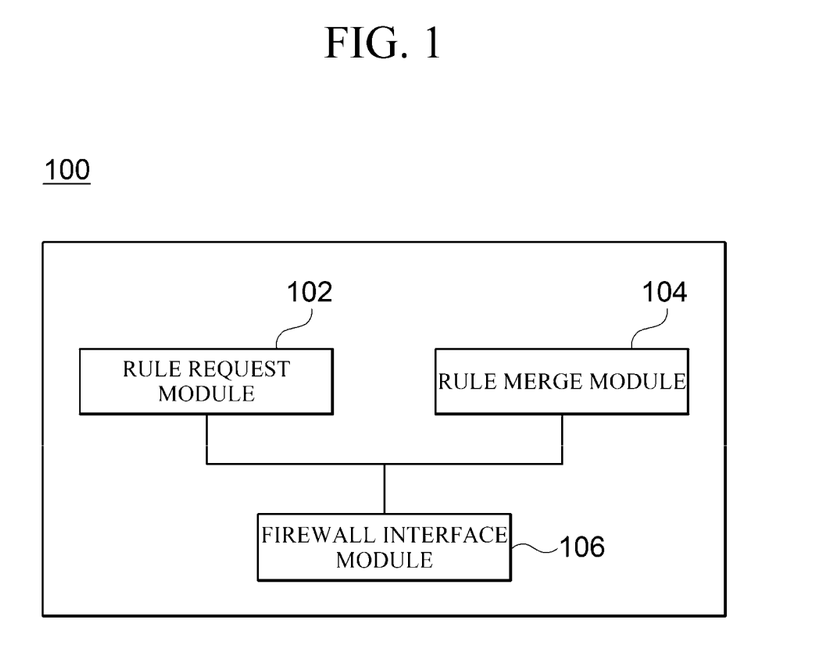
FIG. 1 is a block diagram illustrating an apparatus 100 for managing a security policy of a firewall according to a first embodiment.

FIG. 1 is a block diagram illustrating an apparatus 100 for managing a security policy of a firewall according to a first embodiment. The apparatus 100 for managing the security policy of the firewall according to the disclosed embodiments is an apparatus for registering and managing a rule applied to a firewall (not illustrated). As illustrated, the apparatus 100 for managing the security policy of the firewall according to the first embodiment includes a rule request module 102, a rule merge module 104, and a firewall interface module 106.

The rule request module 102 receives one or more requested rules to be applied to the firewall. In the disclosed embodiments, a firewall application rule means a condition for allowing or blocking inbound or outbound traffic of the firewall.

Such a firewall application rule may include one or more policy elements. Such policy elements may include one or more of a protocol type such as TCP, UDP, etc., an IP address, a port number, an ID, and an allowable period. For example, the firewall application rule can be configured with {protocol, IP, port}.

When the number of rules applied to the firewall exceeds the maximum number of rule registrations of the firewall due to the requested rule, the rule merge module 104 merges the pre-applied rule of the firewall with the one or more requested rules. In this case, the rule merge module 104 merges the pre-applied rule with the one or more requested rules so that a security vulnerable space (SVS) occurring due to the merging is minimized. This will be described in more detail as follows.

In this embodiment, the rule merge module 104 performs rule merging in a stateless method. In the disclosed embodiment, the stateless method means a method of merging a new requested rule based on a rule that has already been applied to a firewall, not rules applied through the rule request module 102.

Let the number of rules already applied to the firewall be firewall rules (FR). If the number of rules newly applied through the rule request module 102 is L, the total number of rules (FR') to be applied to the firewall is FR+L (FR'=FR+L). In this case, if FR' exceeds the maximum number (N) of rule registrations of the firewall as illustrated in Expression 1 below, that is, in the case of $$FR'=FR+L>N,$$ [Expression 1]

the rule merge module 104 configures a merge target rule set including the requested rule and the rule already applied to the firewall, and merges a selected rule pair among the merge target rules included in the merge target rule set into one rule until the number of rules included in the configured merge target rule set is less than or equal to the maximum number (N) of rule registrations.

In the disclosed embodiment, a process of merging a rule pair composed of any two rules into one rule is as follows.

For example, assume that there is a rule composed of (IP address, port) as follows.

Rule 1: (1.1.1.1, Port 20)
Rule 2: (1.1.1.5, Port 40)

In this case, the rules 1 and 2 are merged as follows.

(IP 1.1.1.1~5, Port 20~40)

Such a merged rule has a wider scope than each of the rules 1 and 2. In the case of the above example, the IP address of the merged space includes three additional IPs (1.1.1.2, 1.1.1.3, and 1.1.1.4) in addition to 1.1.1.1 and 1.1.1.5. In addition, the port address also has 19 additional ports (21, 22, 23, . . . 39) in addition to ports 20 and 40 included in the rules 1 and 2. The policy elements (IP address or port, etc.) that are inevitably added by merging of rules in this way are referred to as security vulnerable space (SVS).

In the disclosed embodiments, the rule merge module 104 is configured to merge the pre-applied rule with the one or more requested rules so that the SVS occurring due to merging is minimized. Specifically, the rule merge module 104 calculates an SVS for each of all candidate rule pairs that can be derived from the merge target rules included in the rule set, and selects a rule pair for which the rule merging is to be performed according to each calculated SVS. For example, when N+1 merge target rules including N already set rules and one newly applied policy (L=1) exist in the rule set, the rule merge module 104 performs an operation of selecting any two pairs for the N+1 merge target rules $_{N+1}C2$ times, that is, calculates the SVS value for ((N+1)!/(2!*(N−1)!)) times, and selects a final rule pair whose SVS is minimum as a merging target through comparison of each calculated value. The rule merge module 104 performs merging on the selected rule pair, and after merging, the total number of rules becomes N.

In an embodiment, the rule merge module 104 calculates the SVS value for the specific candidate rule pair by summing the security vulnerable space for each of one or more policy elements included in the specific candidate rule pair. In this case, the rule merge module 104 may calculate the SVS value by applying a preset weight to the security vulnerable space for each of one or more policy elements included in the specific candidate rule pair.

For example, as described above, in the rule set composed of (IP address, port), the security vulnerable space of any i-th rule and any j-th rule may be a value obtained by summing respective policy elements, that is, a security vulnerable space between IP addresses and a security vulnerable space between ports. In this case, i and j are in the range of 1<=i, j<=FR' described in Expression 1 described above. Let the security vulnerable space between the IP addresses of the i-th rule and j-th rule be $IP_{space}(i, j)$, and the security vulnerable space between the ports of the i-th rule and j-th rule be $PORT_{space}(i, j)$. Then, the SVS when the i-th rule and the j-th rule are merged may be determined as illustrated in Expression 2 below.

$$SVS(i,j)=IP_{space}(i,j)*r+PORT_{space}(i,j)*(1-r)$$ [Expression 2]

(In this case, r is the weight and is in the range of 0<=r<=1)

The rule merge module 104 calculates the SVS value of each pair as illustrated in Expression 2 for all rule pairs included in the rule set. Next, as a function for selecting two rules of i-th and j-th rules that are least SVS allowed (LSA) rules among each SVS pair within a policy range (FR') described in Expression 1, the rule merge module 104 performs the following Expression 3.

$$LSA(FR')=SVS_{min}[IP_{space}(i,j)*r+PORT_{space}(i,j)*(1-r)]$$ [Expression 3]

The rule merge module 104 performs rule merging on the rule pairs i and j determined by Expression 3 described above. Specifically, the rule merge module 104 merges a rule pair having a minimum security vulnerable space function value for each policy element to configure a single rule. After such rule merging, the value of FR' described in Expression 1 is updated, and Expression 3 is repeatedly performed until the number of rules included in the rule set reaches the maximum number (N) of rule registrations.

The firewall interface module 106 provides means for the apparatus for managing the security policy of the firewall to communicate with the firewall. In one embodiment, the firewall interface module 106 reads rules FR already applied to the firewall from the firewall and provides the read rules to the rule merge module 104. When Expression 3 described above is executed at least once and then the number FR' of updated merge target rule sets is finally equal to or less than the maximum number (N) of rule registrations, the firewall interface module 106 re-registers FR' new rules in the firewall. The firewall interface module 106 may re-register a new rule using interfaces such as API and CLI provided by the firewall.

According to the embodiment, the firewall interface module 106 may re-register all rules including the merged rule in the firewall, or may selectively re-register only the new rule and merged rule, not all of the rules.

Figure 2:
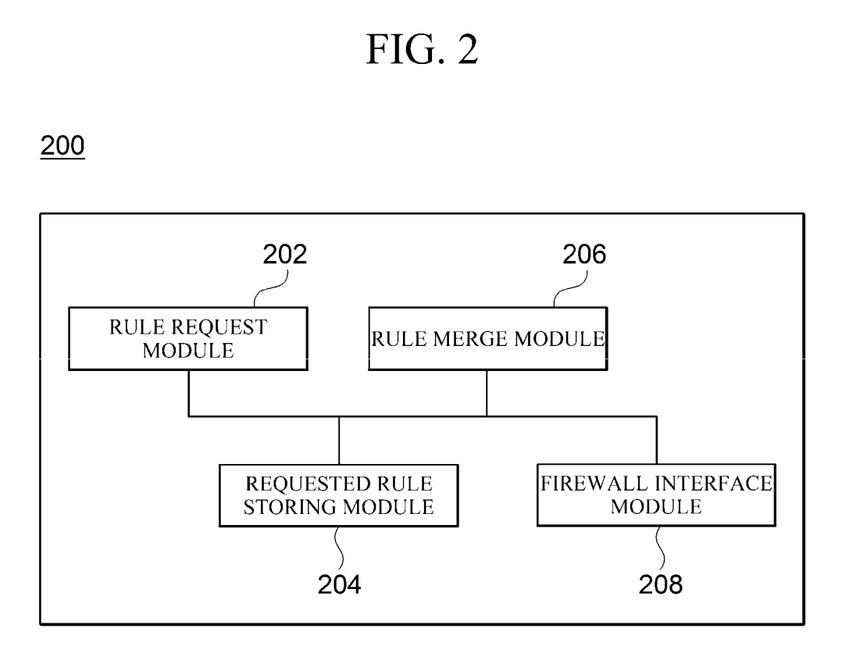
FIG. 2 is a block diagram illustrating an apparatus 200 for managing a security policy of a firewall according to a second embodiment.

FIG. 2 is a block diagram illustrating an apparatus 200 for managing a security policy of a firewall according to a second embodiment. The apparatus 200 for managing the security policy of the firewall according to the second embodiment includes a rule request module 202, a requested rule storing module 204, a rule merge module 206, and a firewall interface module 208. That is, this embodiment is different from that of the first embodiment in that this embodiment further includes the requested rule storing module 204.

The rule request module 202 receives one or more requested rules to be applied to the firewall.

The requested rule storing module 204 accumulates, stores, and manages the requested rules input through the rule request module 202. That is, the requested rule storing module 204 is configured to accumulate and store all requested rules each time a new requested rule is received through the rule request module 202.

When the number of requested rules stored in the requested rule storing module 204 exceeds the maximum number (N) of rule registrations of the firewall, the rule merge module 206 merges at least some of the plurality of requested rules stored in the requested rule storage module 204. In this case, the rule merge module 206 merges the requested rules so that the security vulnerable space (SVS) occurring due to the merging is minimized.

In the second embodiment, the rule merge module 206 performs rule merging in a stateful method rather than a stateless method. In the disclosed embodiment, the stateful method means a method of merging a new requested rule based on the accumulated requested rules.

Let the number of requested rules already stored in the requested rule storing module 204 be RR. If the number of rules newly applied through the rule request module 102 is L, the requested rule storing module 204 accumulates and stores L new rules, and the total number RR' of rules to be applied to the firewall is updated to (RR+L) (RR'=RR+L). In this case, as illustrated in Expression 4, if RR' exceeds the maximum number (N) of rule registrations of the firewall, that is, in the case of, $$RR' = RR + L > N \quad \text{[Expression 4]}$$

the rule merge module 206 adds the newly applied policy and the requested rules accumulated and stored in the requested rule storing module 204 to configure RR' merge target rule sets described in Expression 4.

$$LSA(RR') = SVS_{min}[IP_{space}(i,j)*r + PORT_{space}(i,j)*(1-r)] \quad \text{[Expression 5]}$$

The rule merge module 206 selects any rules i and j that are least SVS allowed rules using Equation 5 for the configured RR' merge target rule sets, and merges the pair of selected rules. The rule merge module 206 repeatedly performs Expression 5 described above until the number of rules included in the merge target rule set is equal to or less than the maximum number (N) of rule registrations. Thereafter, the firewall interface module 208 re-registers the merged rule in the firewall. The process of merging any two rule pairs, the process of selecting a merge target rule set, and the process of re-registering the merged rule in the firewall are the same as those of the first embodiment, and thus a repeated description thereof is omitted here.

In the following, a rule management process in the stateless method according to the first embodiment and a rule management process in the stateful method according to the second embodiment will be respectively illustrated and described.

First, the rule management process in the stateless method according to the first embodiment will be described as follows.

Assume that the maximum number of rule registrations for any firewall is 3 (MAX_FW=3), and the following three rules are registered in the current firewall.

pre-registered rules: ip_addr(1), ip_addr(10), and ip_addr(15)

In general, the IP address is composed of 32 bits (IPv4) or 128 bits (IPv6), but in the present invention, only the difference in operation is simply expressed as the number of decimal units to describe an operation example of the invention.

In this situation, the following new rule has been requested to the rule request module 102.

New requested rule: ip_addr(5)

In this case, when the number (3) of pre-registration rules and the number (1) of new requested rules are summed, the maximum number (3) of rule registrations of the firewall is exceeded (3+1>3). In this case, the rule merge module 104 retrieves a rule already registered in the firewall through the firewall interface module 106 for rule merging, and adds a new requested rule to the retrieved rule to configure a merge target rule set.

In the above example, the merge target rule set is as follows.

(ip_addr(5), ip_addr(1), ip_addr(10), ip_addr(15))

Thereafter, the rule merge module 104 calculates a security vulnerable space function value for each of all candidate rule pairs that can be derived from the merge target rules included in the rule set. All candidate rule pairs that can be derived by substituting the above example into Expression 3 and a security vulnerable space (SVS) generated therefrom are as follows. In this case, in the process of substituting Expression 3, the weight r is applied as 1 for a simple operation example. Therefore, SVS for Port among the policy elements is not taken into consideration.

Case1: merging of ip_addr(5) with ip_addr(1)→ip_addr(1~5), SVS: 3 Ips (2~4)
Case2: merging of ip_addr(5) with ip_addr(10)→ip_addr(5~10), SVS: 4 Ips (6~9)
Case3: merging of ip_addr(5) with ip_addr(15)→ip_addr(5~15), SVS: 9 Ips (6~14)
Case4: merging of ip_addr(1) with ip_addr(10)→ip_addr(1~10), SVS: 8 Ips (2~9)
Case5: merging of ip_addr(1) with ip_addr(15)→ip_addr(1~15), SVS: 13 Ips (2~14)
Case6: merging of ip_addr(10) with ip_addr(15)→ip_addr(10~15), SVS: 4 Ips (11~14)

In the above example, the rule merge module 104 outputs the merging of the first policy and the second policy that minimizes the SVS, that is, Case 1, as a result of executing Expression 3. Therefore, the rule merge module 104 merges ip_addr(5) with ip_addr(1), and re-registers the rule obtained by the merging in the firewall through the firewall interface module 106. The new rules registered in the firewall are as follows.

ip_addr(1~5), ip_addr(10), and ip_addr(15)

Meanwhile, assume that the following new rule has been re-requested to the rule request module 102 in this situation.

new requested rule: ip_addr(7)

As in the previous example, in this case, when the number (3) of pre-registered rules and the number (1) of new requested rules are summed, the maximum number (3) of rule registrations of the firewall is exceeded (3+1>3). The rule merge module 104 re-retrieves a rule already registered in the firewall through the firewall interface module 106 for rule merging, and adds a new requested rule to the retrieved rule to configure a merge target rule set. In the above example, the merge target rule set is as follows.

(ip_addr(7), ip_addr(1~5), ip_addr(10), ip_addr(15))

In addition, in this case, it is possible to find two rules of ip_addr(7) and ip_addr(1-5) that minimize SVS through Expression 3 (in this case, SVS of one IP (6) is generated). Therefore, the rule merge module 104 merges ip_addr (7) and ip_addr (1-5) and re-registers the merged rule in the firewall through the firewall interface module 106. The new rules registered in the firewall are as follows.

(ip_addr(1~7), ip_addr(10), ip_addr(15))

In one embodiment, the firewall interface module 106 may register only the changed rule to register the new rule, not all of the rules. That is, in the above example, the firewall interface module 106 registers only the changed rule ip_addr (1~7) compared with the pre-registered rules, and in this case, deletes the pre-registered rule ip_addr(1) which is previously merged with this rule. In another embodiment, the firewall interface module 106 may delete all of the pre-registered rules and re-register all of the new rules.

In conclusion, as a result of merging twice, a security vulnerable space of 4 IPs (2, 3, 4, and 6) is created.

Next, the rule management process in the stateful method according to the second embodiment will be described as follows.

As in the first embodiment, assume that the maximum number of rule registrations for any firewall is 3 (MAX_FW=3), and the following three rules are currently registered in the firewall.

pre-registered rules: ip_addr(1), ip_addr(10), and ip_addr(15)

In this situation, the following new rule has been requested to the rule request module 202.

new requested rule: ip_addr(5)

In this case, when the number (3) registered rules already stored in the requested rule storing module 204 and the number (1) of new requested rules are summed, the maximum number (3) of rule registrations of the firewall is exceeded (3+1>3). In this embodiment, merging of rules is performed based on the rules accumulated and stored in the requested rule storing module 204, not the rules already registered in the firewall (state pool method). That is, in this case, the rule merge module 206 retrieves a rule already stored in the requested rule storing module 204 for rule merging, and adds a new requested rule to the retrieved rule to configure a merge target rule set. In the above example, the merge target rule set is as follows.

(ip_addr(5), ip_addr(1), ip_addr(10), ip_addr(15))

Thereafter, the rule merge module 206 calculates the security vulnerable space function value for each of all candidate rule pairs that can be derived from the merge target rules included in the rule set. All candidate rule pairs that can be derived from the above example and the security vulnerable spaces (SVS) generated therefrom are as follows.

Case1: merging of ip_addr(5) and ip_addr(1))→ip_addr (1~5), SVS: 3 IPs (2~4)
Case2: merging of ip_addr(5) and ip_addr(10)→ip_addr (5~10), SVS: 4 IPs (6~9)
Case3: merging of ip_addr(5) and ip_addr(15)→ip_addr (5~15), SVS: 9 IPs (6~14)
Case4: merging of ip_addr(1) and ip_addr(10)→ip_addr (1~10), SVS: 8 IPs (2~9)
Case5: merging of IPs ip_addr(1) and ip_addr(15)→ip_addr(1~15), SVS: 13 IPs (2~14)
Case6: merging of ip_addr(10) and ip_addr(15)→ip_addr (10~15), SVS: 4 IPs (11~14)

In the above example, the rule merge module 206 outputs the merging of the first policy and the second policy that minimizes SVS, that is, Case 1, as a result of executing Expression (5). Therefore, the rule merge module 206 merges ip_addr(5) with ip_addr(1) and re-registers the rule obtained by the merging in the firewall through the firewall interface module 208.

The new rules registered in the firewall are as follows.

ip_addr(1~5), ip_addr(10), and ip_addr(15)

Meanwhile, assume that the following new rule has been requested to the rule request module 202 in this situation.

new requested rule: ip_addr(7)

In this case, when the number of policy rules already stored in the requested rule storing module 204 (4) and the number of new requested rules (1) are summed, the number of rules to be registered in the firewall is 5, which exceeds the maximum number (3) of rule registrations (4+1>3). Therefore, the rule merge module 206 retrieves a rule already stored in the requested rule storing module 204 for rule merging and adds a new requested rule to the retrieved rule to configure a merge target rule set. In the above example, the merge target rule set is as follows.

(ip_addr(7), ip_addr(5), ip_addr(1), ip_addr(10), ip_addr (15))

In addition, since the number of rules exceeded is two, the rule merge module 206 performs merging twice instead of once. That is, Expression 5 is performed twice.

First, the merge target rule pair that can minimize the security vulnerable space in the merge targets by executing Expression 5 above is (ip_addr(7), ip_addr(5)). Therefore, the rule merge module 206 first merges (ip_addr(7), ip_addr (5)). The first merge result is as follows.

(ip_addr(5~7), ip_addr(1), ip_addr(10), ip_addr(15))

If Expression 5 is executed based on the first merge result, the merge target rule pair that can minimize the security vulnerable space is (ip_addr(5-7), ip_addr(10)). Therefore, the rule merge module 206 secondly merges (ip_addr(5-7), ip_addr(10)). The second merge result is as follows.

(ip_addr(5~10), ip_addr(1), ip_addr(15))

As a result of merging twice, the number of rules has reached the maximum number of rule registrations in the firewall, and thus the rule merge module 206 re-registers the merged rules in the firewall through the firewall interface module 208. The firewall interface module 208 may register only the changed rule in order to register the new rule in the firewall. That is, only ip_addr (5~10), which is a changed rule compared to the pre-registered rules, is registered, and in this case, the pre-registered rule ip_addr (10) already merged with this changed rule is deleted. In another embodiment, the firewall interface module 208 may delete all of the pre-registered rules and re-register all of the new rules.

As a result, a security vulnerable space of three IPs (6, 8, 9), which is a smaller number than that of the first embodiment, is created, as a result of the merging twice.

In the case of the stateful method, a separate requested rule storing module 204 should accumulate and store requested rules for each firewall. Therefore, the stateful method requires extra storage space and has a disadvantage of more computation amount than the stateless method. However, the stateful method is suitable for a service that requires a high security service level agreement (SLA) because it can minimize the security vulnerable space created as a final result.

In contrast, in the case of the stateless method, there is no need to accumulate and store the requested rule separately, and there is no need for extra storage space, and the calculation amount is less than that of the stateful method. However, since the created security vulnerable space is larger than the stateful method, and thus the stateless method is suitable for a service that requires a security service level agreement (SLA), which is not relatively high.

Figure 3:
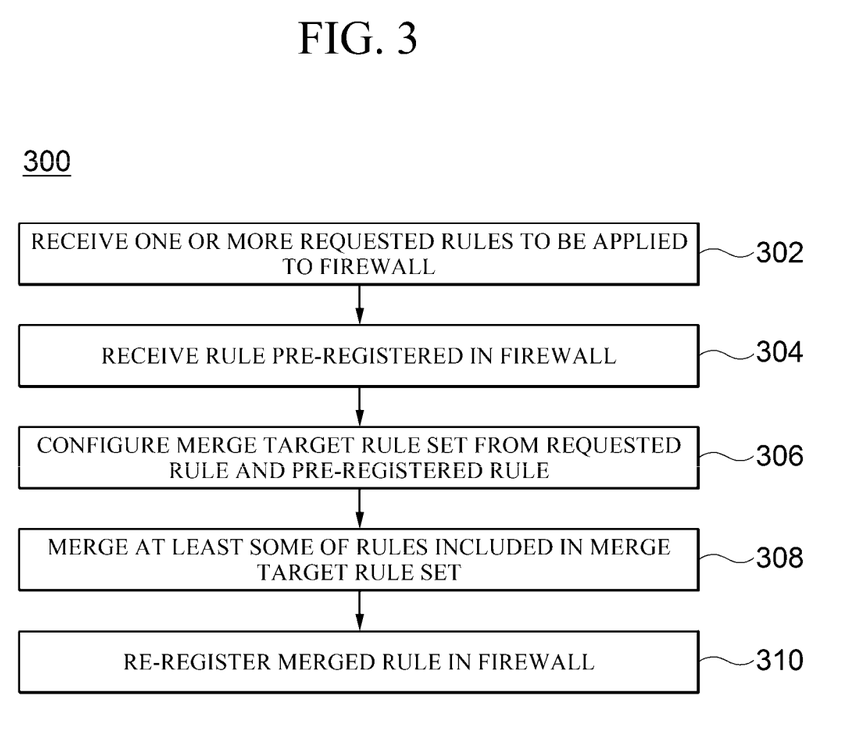
FIG. 3 is a flow chart for explaining a method 300 for managing the security policy of the firewall according to the first embodiment.

FIG. 3 is a flowchart illustrating a method 300 for managing the security policy of the firewall according to the first embodiment. The illustrated flowchart may be performed by a computing device that includes one or more processors and a memory for storing one or more programs executed by the one or more processors, for example, the apparatus 100 for managing the security policy of the firewall described above. In the illustrated flowchart, the method or process is described by being divided into a plurality of steps, but at least some of the steps may be performed in a different order, performed together by being combined with other steps, omitted, performed by being divided into detailed steps, or performed by being added with one or more steps (not illustrated).

In step 302, the rule request module 102 receives one or more requested rules to be applied to the firewall.

In step 304, when the number of rules applied to the firewall exceeds the maximum number of rule registrations of the firewall due to the requested rule, the firewall interface module 106 reads rules already registered in the firewall.

In step 306, the rule merge module 104 adds the pre-applied rule of the firewall provided through the firewall interface module 106 and the requested rule to configure a merge target rule set.

In step 308, the rule merge module 104 performs rule merging for one or more rules included in the merge target rule set so that the security vulnerable space occurring due to the merging is minimized.

In step 310, the firewall interface module 106 re-registers the merged rule in the firewall.

Figure 4:
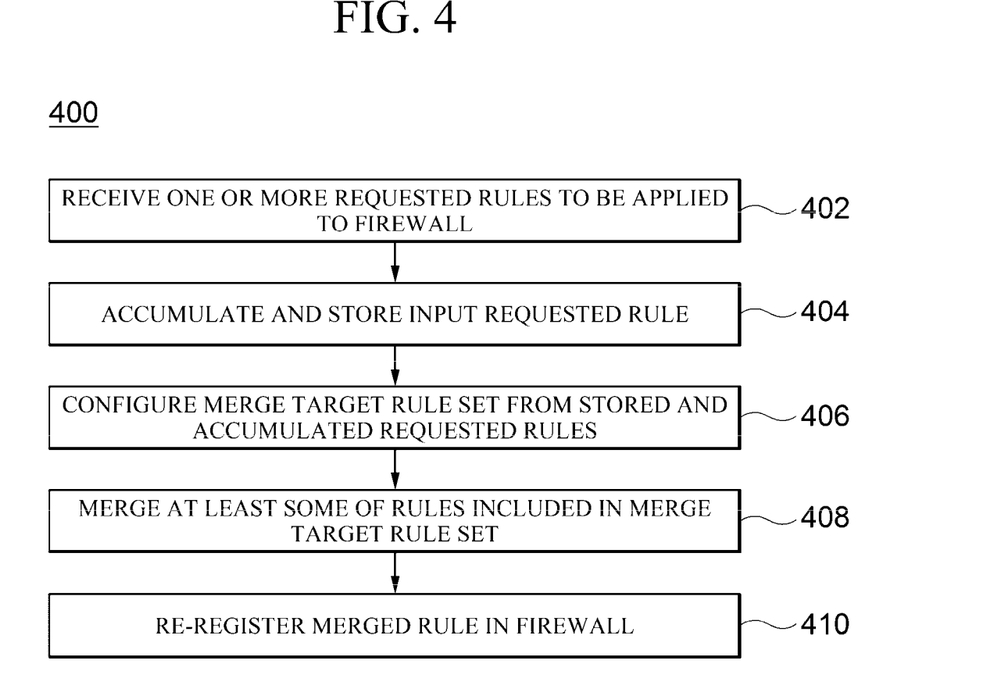
FIG. 4 is a flowchart illustrating a method 400 for managing the security policy of the firewall according to the second embodiment.

FIG. 4 is a flowchart illustrating a method 400 for managing the security policy of the firewall according to the second embodiment. The illustrated flowchart may be performed by a computing device that includes one or more processors and a memory for storing one or more programs executed by the one or more processors, for example, the apparatus 200 for managing the security policy of the firewall described above. In the illustrated flowchart, the method or process is described by being divided into a plurality of steps, but at least some of the steps may be performed in a different order, performed together by being combined with other steps, omitted, performed by being divided into detailed steps, or performed by being added with one or more steps (not illustrated).

In step 402, the rule request module 202 receives one or more requested rules to be applied to the firewall.

In step 404, the requested rule storing module 204 accumulates and stores the requested rule input through the rule request module 202.

In step 406, when the accumulated number of the requested rules stored in the requested rule storing module 204 exceeds the maximum number of rule registrations of the firewall, the rule merge module 206 configures the accumulated rules stored in the requested rule storage module 204 into a merge target rule set. The merge target rule set may be recorded in the memory of the apparatus 200 for managing the security policy of the firewall for rule merging to be described later.

In step 408, the rule merge module 206 merges the merge target rule set so that the security vulnerable space occurring due to merging is minimized until the size of the merge target rule set configured in step 406 reaches the maximum number of firewall rule registrations.

In step 410, the firewall interface module 208 re-registers the merged rule in the firewall.

Figure 5:
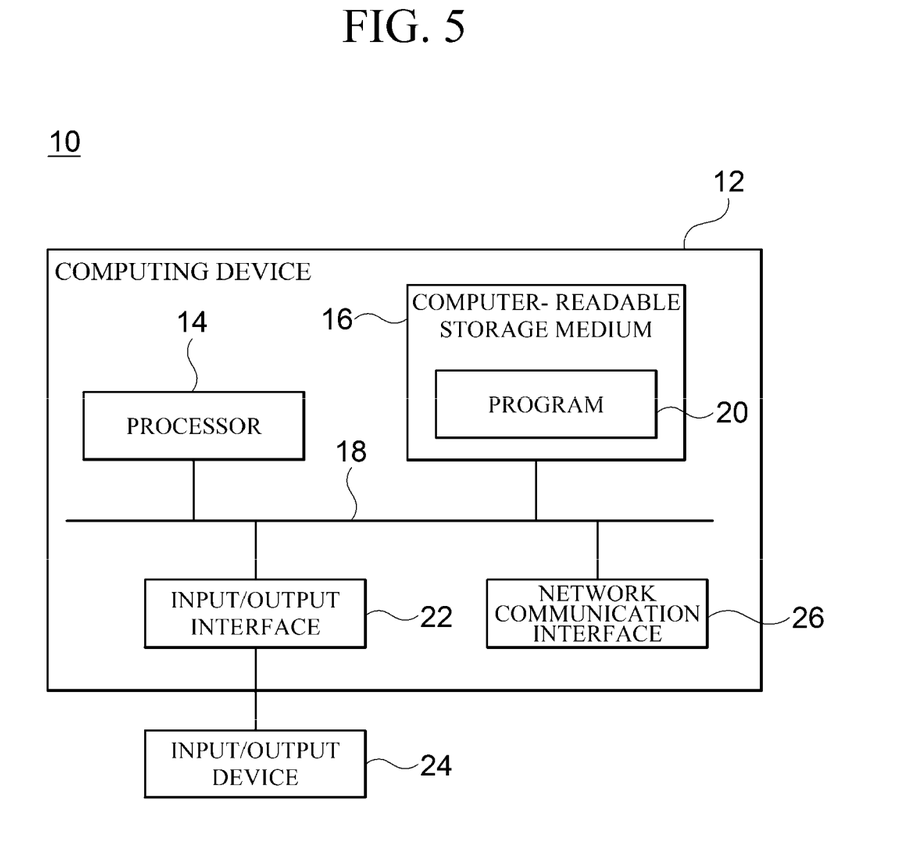
FIG. 5 is a block diagram illustrating and describing a computing environment 10 including a computing device suitable for use in exemplary embodiments.

FIG. 5 is a block diagram for illustratively describing a computing environment 10 that includes a computing device suitable for use in exemplary embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the apparatuses 100 and 200 for managing the security policy of the firewall. The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured to cause the computing device 12 to perform operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Meanwhile, the embodiment of the present invention may include a program for performing the methods described in this specification on a computer, and a computer-readable recording medium containing the program. The computer-readable recording medium may contain program instructions, local data files, local data structures, etc., alone or in combination. The computer-readable recording medium may be specially designed and configured for the present invention, or may be commonly used in the field of computer software. Examples of computer-readable recording media include magnetic media such as a hard disk, a floppy disk, and a magnetic tape, optical recording media such as a CD-ROM and a DVD, and hardware devices such as a ROM, a RAM, a flash memory, etc., that are specially configured to store and execute program instructions are included. Examples of the program may include a high-level language code that can be executed by a computer using an interpreter, etc., as well as a machine language code generated by a compiler.

Although the present invention has been described in detail through representative examples above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. An apparatus for managing a security policy of a firewall comprising:
one or more hardware processors configured to:
receive one or more requested rules to be applied to a firewall;
receive a pre-applied rule of the firewall from the firewall when a number of rules applied to the firewall exceeds a maximum number of rule registrations of the firewall due to the one or more requested rules;
configure a merge target rule set including the one or more requested rules and the pre-applied rule of the firewall;
calculate a security vulnerable space function value for each of all candidate rule pairs that can be derived from merge target rules included in the merge target rule set;
merge at least some of the merge target rules based on the security vulnerable space function value so that a security vulnerable space occurring due to the merging is minimized; and
re-register a merged rule in the firewall.

2. The apparatus of claim 1, wherein the one or more hardware processors are further configured to
merge a selected rule pair among merge target rules included in the merge target rule set into one rule until a number of rules included in the merge target rule set is less than or equal to the maximum number of rule registrations.

3. The apparatus of claim 2, wherein the one or more hardware processors are further configured to
select a rule pair for which the rule merging is to be performed according to the calculated security vulnerable space function value.

4. The apparatus of claim 3, wherein the one or more hardware processors are further configured to calculate a security vulnerable space function value for a specific candidate rule pair by summing security vulnerable space for each of one or more policy elements included in the specific candidate rule pair.

5. The apparatus of claim 4, wherein the one or more hardware processors are further configured to:
calculate the security vulnerable space function value by applying a preset weight to the security vulnerable space for each of one or more policy elements included in the specific candidate rule pair; and
select a rule pair having a minimum security vulnerable space function value among the calculated security vulnerable space function values as a rule pair for which the rule merging is to be performed.

6. An apparatus for managing a security policy of a firewall comprising:
one or more hardware processors configured to:
receive a requested rule to be applied to a firewall;
accumulate, store, and manage the received requested rule;
configure a merge target rule set including the plurality of stored requested rules when a number of the plurality of stored requested rules exceeds a maximum number of rule registrations of the firewall;
calculate a security vulnerable space function value for each of all candidate rule pairs that can be derived from merge target rules included in the merge target rule set;
merge at least some of the merge target rules based on the security vulnerable space function value so that a security vulnerable space occurring due to the merging is minimized; and
re-register a merged rule in the firewall.

7. The apparatus of claim 6, wherein the one or more hardware processors are further configured to
merge a selected rule pair among merge target rules included in the merge target rule set into one rule until a number of rules included in the merge target rule set is less than or equal to the maximum number of rule registrations.

8. The apparatus of claim 7, wherein the one or more hardware processors are further configured to
select a rule pair for which the rule merging is to be performed according to the calculated security vulnerable space function value.

9. The apparatus of claim 8, wherein the one or more hardware processors are further configured to calculate a security vulnerable space function value for a specific candidate rule pair by summing security vulnerable space for each of one or more policy elements included in the specific candidate rule pair.

10. The apparatus of claim 9, wherein the one or more hardware processors are further configured to:
calculate the security vulnerable space function value by applying a preset weight to the security vulnerable space for each of one or more policy elements included in the specific candidate rule pair; and
select a rule pair having a minimum security vulnerable space function value among the calculated security vulnerable space function values as a rule pair for which the rule merging is to be performed.

11. A method for managing a security policy of a firewall performed by one or more hardware processors, the method comprising:
receiving one or more requested rules to be applied to the firewall;
receiving a pre-applied rule of the firewall from the firewall when a number of rules applied to the firewall exceeds a maximum number of rule registrations of the firewall due to the one or more requested rules;
configuring a merge target rule set including the one or more requested rules and the pre-applied rule of the firewall;
calculating a security vulnerable space function value for each of all candidate rule pairs that can be derived from merge target rules included in the merge target rule set;

merging at least some of the merge target rules based on the security vulnerable space function value so that a security vulnerable space occurring due to the merging is minimized; and re-registering a merged rule in the firewall.

12. The method of claim 11, wherein the merging at least some of the merge target rules comprises merging a selected rule pair among merge target rules included in the merge target rule set into one rule until a number of rules included in the merge target rule set is less than or equal to the maximum number of rule registrations.

13. The method of claim 12, wherein the merging at least some of the merge target rules, further comprises selecting a rule pair for which the rule merging is to be performed is selected according to the calculated security vulnerable space function value.

14. The method of claim 13, wherein the merging at least some of the merge target rules, further comprises calculating a security vulnerable space function value for a specific candidate rule pair by summing security vulnerable space for each of one or more policy elements included in the specific candidate rule pair.

15. The method of claim 14, wherein, in the merging at least some of the merge target rules, further comprises:

calculating the security vulnerable space function value by applying a preset weight to the security vulnerable space for each of one or more policy elements included in the specific candidate rule pair; and selecting a rule pair having a minimum security vulnerable space function value among the calculated security vulnerable space function values as a rule pair for which the rule merging is to be performed.

16. A method for managing a security policy of a firewall performed by one or more hardware processors, the method comprising:

receiving a requested rule to be applied to the firewall;

accumulating, storing, and managing the received requested rule;

configuring a merge target rule set including the plurality of stored requested rules when a number of the plurality of stored requested rules exceeds a maximum number of rule registrations of the firewall;

calculating a security vulnerable space function value for each of all candidate rule pairs that can be derived from merge target rules included in the merge target rule set merging at least some of the merge target rules based on the security vulnerable space function value so that a security vulnerable space occurring due to the merging is minimized; and re-registering a merged rule in the firewall.

17. The method of claim 16, wherein the merging at least some of the merge target rules, comprises merging a selected rule pair among merge target rules included in the merge target rule set into one rule until a number of rules included in the merge target rule set is less than or equal to the maximum number of rule registrations.

18. The method of claim 17, wherein the merging at least some of the merge target rules, further comprises selecting a rule pair for which the rule merging is to be performed according to the calculated security vulnerable space function value.

19. The method of claim 18, wherein the merging at least some of the merge target rules further comprises calculating a security vulnerable space function value for a specific candidate rule pair by summing security vulnerable space for each of one or more policy elements included in the specific candidate rule pair.

20. The method of claim 19, wherein the merging at least some of the merge target rules, further comprises:

calculating the security vulnerable space function value by applying a preset weight to the security vulnerable space for each of one or more policy elements included in the specific candidate rule pair; and selecting a rule pair having a minimum security vulnerable space function value among the calculated security vulnerable space function values as a rule pair for which the rule merging is to be performed.

* * * * *